Patented Oct. 26, 1926.

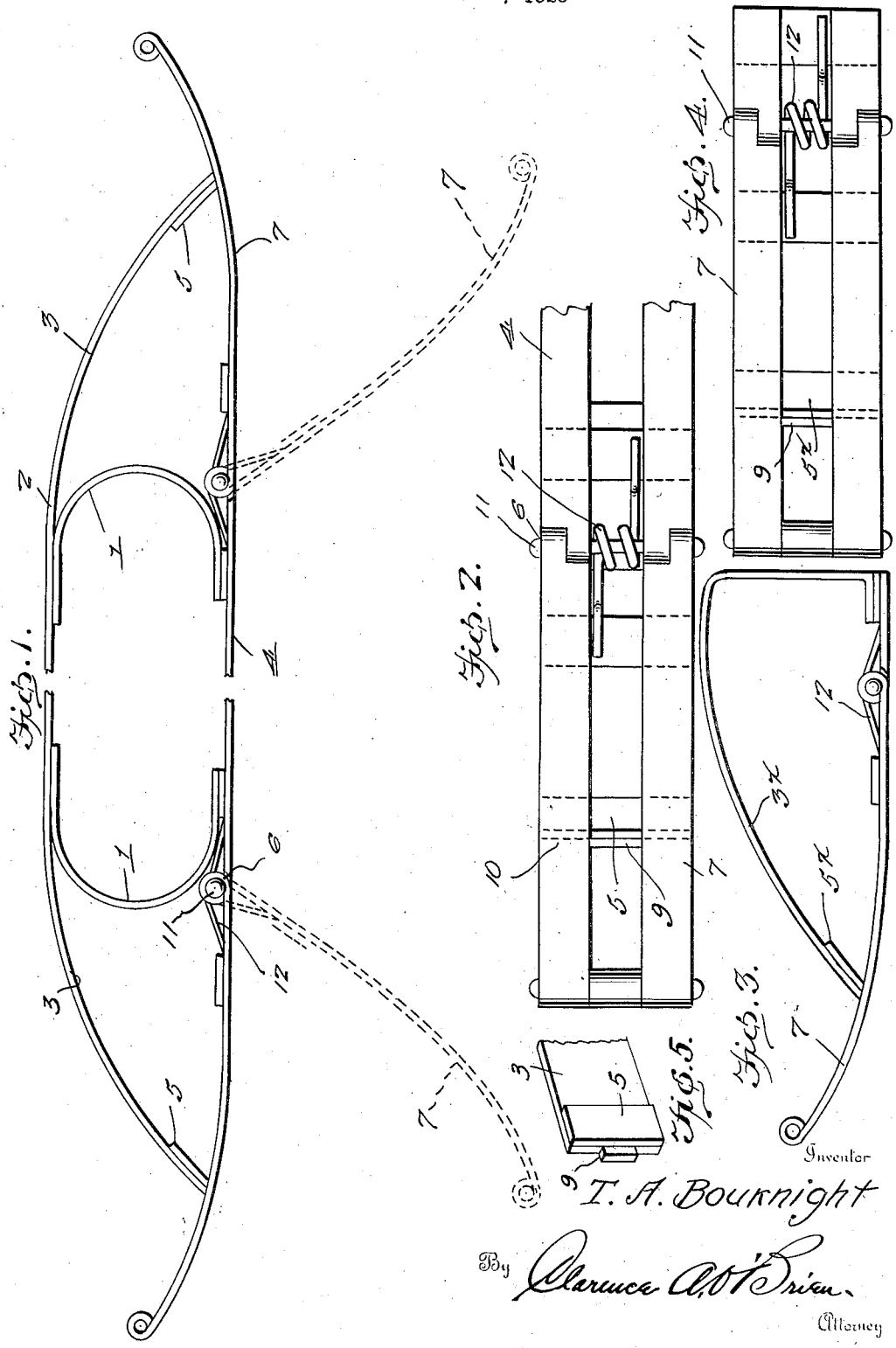

1,604,256

UNITED STATES PATENT OFFICE.

THURMAN A. BOUKNIGHT, OF GREENVILLE, TEXAS.

AUTOMOBILE BUMPER.

Application filed December 18, 1925. Serial No. 76,239.

My present invention pertains to bumpers for use on automobiles, and contemplates the provision of a bumper so characterized that when caught into or engaged with a portion of an automobile or any other object, the bumper may be readily extricated, without damage to the bumper or the part caught by or engaged with the same.

To the attainment of the foregoing, the invention consists in the improvement as hereinafter described and definitely claimed.

In the accompanying drawings, forming part of this specification:—

Figure 1 is a top plan view illustrative of a front bumper constructed in accordance with the preferred embodiment of my invention.

Figure 2 is a fragmentary front elevation of a portion of the same.

Figure 3 is a top plan view of a rear bumper constructed in accordance with my invention.

Figure 4 is a rear elevation of said rear bumper.

Figure 5 is a detail perspective showing one of the reduced end extensions or tongues hereinafter explicitly referred to.

Similar numerals designate corresponding parts in Figures 1 and 2 to which reference will first be made.

Among other elements the front bumper as shown in Figures 1 and 2 comprises a body made up of U-shaped members 1, a rear bar 2 fixed with respect to the members 1 and having curvilinear portions 3, and front bars 4, appropriately fixed to the said members 1. The said front bars 4 are spaced apart vertically, Figure 2. I would also have it understood that in the preferred embodiment of my invention the curvilinear extensions 3 of the back bar 2 are provided adjacent to their ends with pads 5, of vulcanized rubber or other appropriate material, calculated to avert rattling. Hingedly connected at 6 to the outer ends of the pairs of front bars 4 are the novel swingable members 7 of the bumper, each of the said swingable members 7 preferably comprising lower and upper spaced bars, Figure 2, and the extensions 3 of the back bar 2 being provided with reduced end extensions or tongues 9 adapted to enter between the lower and upper bars 4 after the manner shown at the left of Figure 2, so as to prevent casual vibration up and down of the members 7 and to enable the curvilinear extensions 3 of the back bar 2 to bear solidly at 10 against the members 7, and this without interfering in any measure with the forward movement of the said members 7 to the dotted line position when an emergency arises that makes such movement of the members 7 necessary. The hinge connection alluded to includes a pintle 11 and a spring 12, the said spring being coiled about the pintle and having arms arranged to bear against the members 7 and portions carried by the bars 4, respectively. The springs operate to normally maintain the members 7 in the full line positions shown in Figure 1, relative to the body of the bumper, so that under ordinary conditions the bumper will have the same capacity of function as an ordinary bumper used at the forward end of an automobile. It will be understood, however, that in the event of either of the members 7 catching into a part of another automobile, the automobile equipped with my improvement may be readily extricated by swinging the member 7 involved into the dotted line position, and this may be done by hand or may be done by backing of the automobile equipped with the preferred embodiment of my invention. It will also be understood that subsequently to the release of either of the members 7 from an automobile part engaged thereby, the spring complementary to the said member 7 will promptly return the member 7 to its normal position, at which time the pad opposed to the said member 7 will cushion the member 7 when it brings up against the extension 3 of the body bar 2.

Notwithstanding the advantageous capacity of function ascribed to my novel front bumper, it will be readily appreciated that the said bumper is but little more expensive than ordinary front bumpers extant.

In Figures 3 and 4, my invention is shown as embodied in rear bumpers for use at opposite sides of the longitudinal center of an automobile. The rear bumper illustrated includes a swinging member 7 and a spring 12 for yieldingly maintaining the said swinging member against the body portion or extension $3^x$, and it will also be noted that the said body portion $3^x$ is provided with a cushioning pad $5^x$ similar in character and arrangement to the pad 5 of Figure 1. It will also be understood that in the rear bumper the hinged connection of the member 7 is secured to an appropriate part of the bumper body.

As will be readily understood from the foregoing, the rear bumper constructed as shown in Figures 3 and 4 and hereinbefore described is adapted to efficiently operate under ordinary conditions in the same manner as an ordinary rear bumper, and yet when the member 7 of the rear bumper is caught into or against a part of another automobile, the said member 7 may be manipulated in the same manner as the member 7 in Figures 1 and 2, for the quick and easy disengagement of the improved bumper from the part of the other car engaged.

The embodiments herein illustrated and described are the best practical embodiments of my invention of which I am cognizant. I do not desire, however, to be understood as confining myself to the specific construction and relative arrangement of parts as disclosed, my invention being defined by my appended claims within the scope of which changes in structure and arrangement may be made without departure from my invention.

Having described my invention, what I claim and desire to secure by Letters-Patent,- is:—

1. In an automobile bumper, the combination of a body having upper and lower spaced bars, an extension on said body having a pad thereon, and a swingable member made up of upper and lower spaced bars and connected to the body and adapted to bring up against said extension and pad, subject to the influence of spring means for yieldingly maintaining it against and returning it to abutting position against the extension.

2. An automobile bumper comprising a body and an extension thereon, a swingable member on the body and arranged to bring up against and be interlocked with the extension, and spring means cooperating with the body and the swingable member to yieldingly maintain the latter in working position.

3. An automobile bumper comprising a body and an extension thereon, a swingable member on the body and arranged to bring up against and be interlocked with the extension, and spring means cooperating with the body and the swingable member to yieldingly maintain the latter in working position; the said swingable member having upper and lower spaced bars and being arranged in its normal working position to be supported by the body and by the said extension.

4. In an automobile bumper, the combination of a body having upper and lower spaced bars, an extension on said body having a pad thereon, and a swingable member made up of upper and lower spaced bars and connected to the body and adapted to bring up against said extension and pad, subject to the influence of spring means for yieldingly maintaining it against and returning it to abutting position against the extension, said extension also having a reduced end portion or tongue normally resting between the spaced bars of the swingable member.

5. An automobile body comprising a body and an extension thereon, a swingable member on the body and arranged to bring up against and be interlocked with the extension, and spring means cooperating with the body and the swingable member to yieldingly maintain the latter in working position; said extension equipped with a pad opposed to the swingable member.

In testimony whereof I affix my signature.

THURMAN A. BOUKNIGHT